Aug. 1, 1950
H. H. GOTBERG
2,517,104
HELICAL BROACHING FIXTURE
Filed March 5, 1947
2 Sheets-Sheet 1
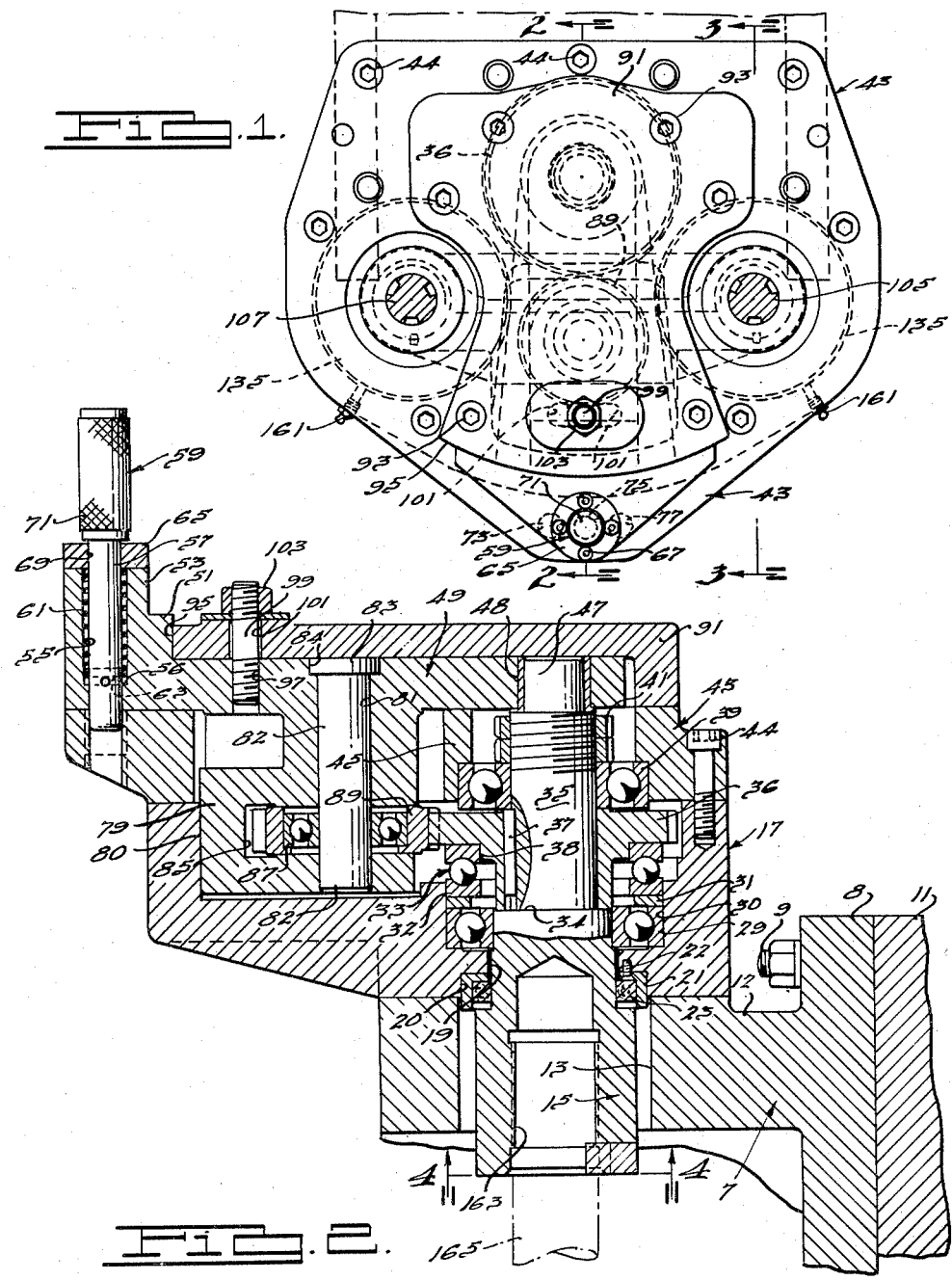
INVENTOR.
Harry H. Gotberg.
BY
Harness, Dickey & Pierce.
ATTORNEYS.

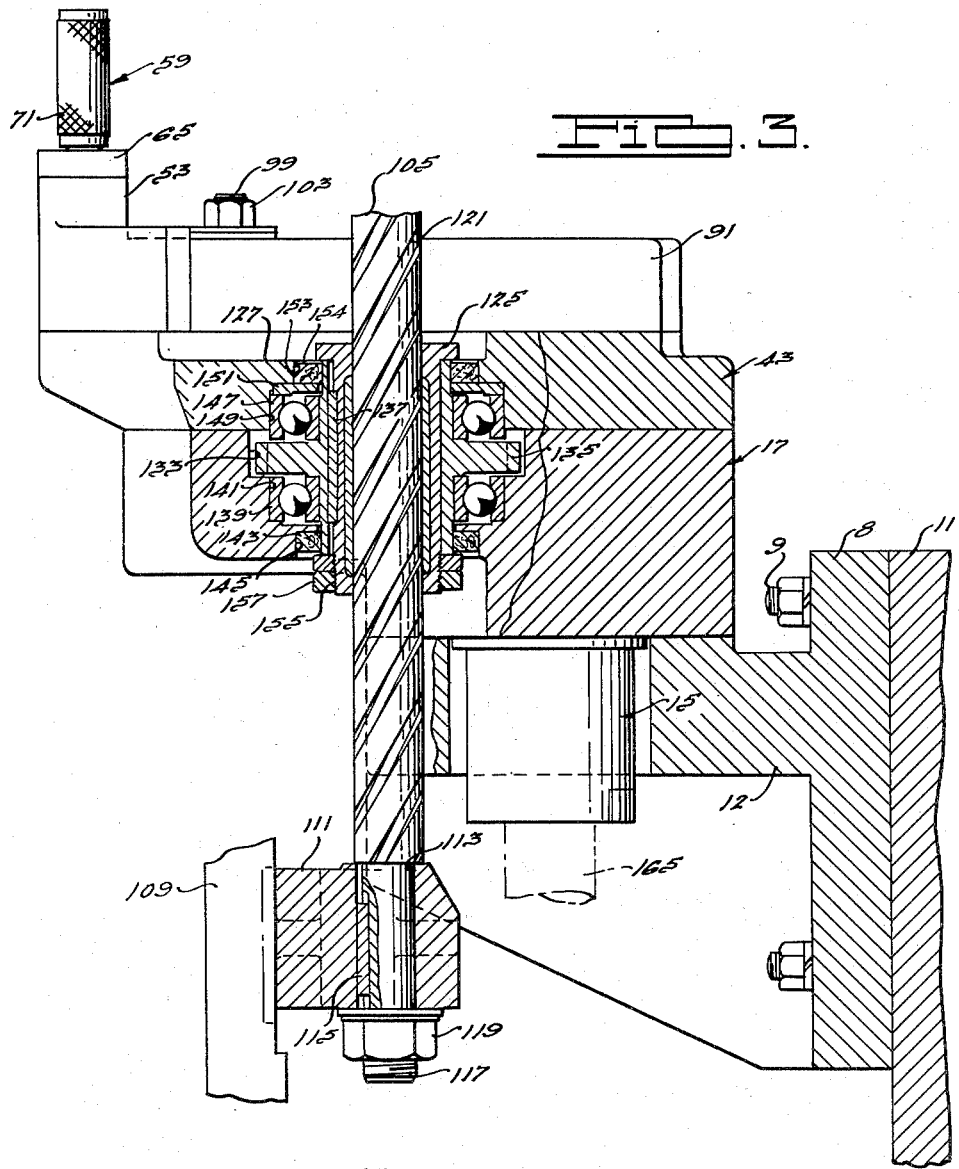
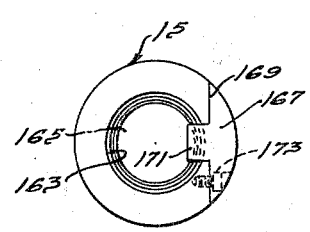

Patented Aug. 1, 1950

2,517,104

UNITED STATES PATENT OFFICE 2,517,104

HELICAL BROACHING FIXTURE

Harry H. Gotberg, Detroit, Mich., assignor to Colonial Broach Company, Warren Township, Macomb County, Mich., a corporation of Delaware Application March 5, 1947, Serial No. 732,542

5 Claims. (Cl. 90—33)

The invention relates to a helical broaching fixture for use on a pull broach machine, and more particularly to such a fixture whereby either straight splines, or right or left-hand helical splines may be broached in a workpiece opening.

At the present time, pull-type broach machines of either the pull up, pull down, or horizontal type use fixtures in conjunction therewith for broaching helical splines in a workpiece opening. Such fixtures employ a helically splined lead bar which is specially designed for each splined opening. If a fixture is being used in conjunction with the pull broach machine for broaching right hand helical splines in a workpiece opening and it is desired to broach left-hand helical splines therein, it is necessary to disassemble the fixture and substitute a left-hand helical lead bar for the right-hand one being used. The same is true if it is desired to broach a spline having a different helix angle. This, of course, consumes time and constitutes a disadvantage in present helical broaching fixtures.

Accordingly, it is an object of this invention to provide a helical broaching fixture for use with a pull broach machine whereby either one of two different helix angle splines or straight splines can be broached in a workpiece opening without disassembling or altering the fixture. The two helix angles may both be of the same hand or may be of different hand and either the same or different angles.

It is a further object of this invention to provide a helical broaching fixture which can be quickly and easily adjusted so as to broach different helical splines in a workpiece opening.

It is a further object of this invention to provide a helical broaching fixture of the aforementioned type which is simple in operation, rugged in construction, and inexpensive to manufacture.

These and other objects of the invention will become apparent from the following detailed description taken in conjunction with the accompanying drawings, in which:

Figure 1 is a plan view of the fixture of this invention;

Fig. 2 is a view partially in section and partially in elevation taken along the line 2—2 of Fig. 1;

Fig. 3 is a view partially in section and partially in elevation taken along the line 3—3 of Fig. 1; and Fig. 4 is an end elevational view taken along the line 4—4 of Fig. 2.

The fixture of this invention is adapted to be used with a pull broach machine of the general type illustrated in Patent No. 2,395,702, issued February 26, 1946, and assigned to the assignee of this application. The fixture may be used with a pull-down broaching machine, as illustrated in the aforementioned patent, or with any pull-up or horizontal broaching machine. Considering Fig. 1 as a top plan view, the fixture is herein illustrated as mounted on a pull-up broaching machine.

A generally L-shaped fixture mounting bracket 7 has its vertical leg 8 rigidly connected by means of bolts 9 to the sliding ram 11 of a broaching machine. The upper horizontal leg 12 of the bracket 7 is provided with an aperture 13 therein through which a broach chuck 15 passes. The horizontal leg 12 is rigidly connected to and supports a housing member, generally indicated at 17, on the upper surface thereof. The housing member 17 has a generally hollow interior and is provided adjacent the rear end thereof, as viewed in Fig. 2, with a vertical aperture 19 for receiving the upper end of a chuck 15. The lower end of the aperture 19 is enlarged to provide a recess 20 which receives an apertured cup-like member 21 therein which is secured to the housing by means of countersunk screws 22. A conventional oil seal 23 is positioned in the cup member 21 and engages the outer periphery of the chuck to prevent leakage of lubricating oil from the housing.

The chuck 15 is rotatably supported in the housing 17 by means of an antifriction bearing 29 positioned in an enlarged recess 30 adjacent the upper end of the aperture 19. Positioned within the recess 30 and on top of the bearing 29 is a thrust washer 31 adapted to support the lower race 32 of a thrust bearing 33. The chuck 15, immediately above the bearing 29, is provided with a shank 35. A coaxial gear 36 is secured to the shank 35 by a key 37, and the lower end of the gear hub abuts the annular shoulder 34 at the lower end of the shank. The gear 36 is formed with an enlarged hub portion 38 on the underside thereof, and the upper race of the thrust bearing 33 is pressed thereon. An antifriction bearing 39 having its inner race pressed on the chuck shank 35 abuts the upper surface of the gear 36. The bearings are fixed in position on the chuck shank 35 by means of lock nuts 41.

Positioned on the top surface of the housing 17 is a main cover member, generally indicated at 43, which is secured to the housing by means of screws 44. The main cover has a generally hollow interior and surrounds the chuck shank. The cover is provided, however, with a depending circular wall 45 which is recessed to receive the outer race of the bearing 39.

The extreme upper end of the chuck shank 35 is reduced in diameter to provide a pivot pin 47. A flanged bushing 48 is positioned over the pivot pin 47 and the flanged portion of the bushing abuts the shoulder between the pivot pin and the threaded shank portion 35. A swinging member generally indicated at 49, is pivoted on pin 47 and slidably supported on the top surface of the main cover 43.

The top surface, on the opposite end of the member 49, is stepped up, as at 51, to provide an arcuate shoulder, and adjacent to the shoulder 51 is positioned an upwardly projecting boss 53. The boss 53 is provided with an aperture 55 therethrough which is reduced in diameter adjacent the lower end thereof to provide an annular shoulder 56. The shank portion 57 of a lock pin, generally indicated at 59, is received in the aperture 55 and a coil spring 61, surrounds the shank 57 and is positioned within the enlarged portion of the aperture 55 The lock pin shank 57 is provided with a laterally extending pin 63 adjacent the lower end thereof aaginst which the lower end of the spring abuts. An annular ring 65 is secured to the top surface of the boss 53 by means of screws 67. The inner periphery 69 of the ring 65 is of a smaller diameter than the diameter of the enlarged portion of the aperture 55 so as to retain the upper end of the coil spring 61. The upper end of the shank 57 terminates in an enlarged cylindrical hand grip portion 71, which portion abuts against the top surface of the annular ring 65 to limit the downward movement of the lock pin 59.

The main cover member 43 is provided with three laterally spaced apertures 73, 75, and 77, one of which is adapted to be aligned with the lower end of the lock pin 59 so as to receive the lower end of the lock pin shank 57 when the member 49 is swung about pin 47 to the corresponding position, as will be hereinafter brought out. The swinging member 49 is formed adjacent the rear end thereof with a depending portion 79, one side of which slidably engages a cylindrical side wall portion of the housing 17 at 80. This portion 79 of the member 49 is provided with a vertical bore 81 in which is fitted a pin 82 having a head 83 on the upper end thereof which is received in a counterbore 84 at the upper end of the bore 80. Adjacent the lower end of the pin 82 the adjusting member depending portion 79 is provided with a slot 85. Positioned within the slot 85 and pressed on the pin 82 is an antifriction bearing 87. Fixedly mounted on the outer race of the bearing 87 is a gear 89 which is constantly in mesh with the gear 36 mounted on the chuck shank.

Secured to the top surface of the main cover 43 is an auxiliary cover member 91. The cover 91 is secured to the main cover 43 by means of a plurality of screws 93. The underside of the cover 91, forwardly of the rear end of the fixture is in sliding engagement with the upper surface of the sliding member 49. The forward end of the cover 91 is of an arcuate shape, as at 95, as can be seen in Fig. 1, and abuts against the arcuate shoulder 51 on the forward end of the sliding member 49. Forwardly of the gear 89, the member 49 is provided with a tapped aperture 97 in which is threaded a stud 99, the upper end of which projects through a slotted aperture 101 in the upper cover 91. A nut 103 is threaded on the upper end of the stud to hold the upper cover in a proper sliding relation with the upper surface of the sliding member 49. The slotted aperture 101 limits the sliding movement of the member 49 with respect to the upper cover.

Extending through the housing 17 and the cover member 43 on opposite sides of the gears 36 and 89 are a pair of vertical stationary lead bars 105 and 107. Each of the lead bars is rigidly secured to a stationary portion 109 of the broaching machine by means of a bracket 111 which is provided with an aperture 113 therethrough. The lower end of each lead bar passes through the aperture 113 and is rigidly connected to the bracket by means of a key 115. The extreme lower end of each lead bar is threaded, as at 117, and a nut 119 is threaded thereon to lock and position each of the lead bars with respect to the broaching machine. The upper end of each lead bar (not shown) is similarly fixedly connected to the broaching machine.

Each of the lead bars 105 and 107 are provided with a continuous helical spline 121 extending along the entire length thereof, but the splines of the two bars are of different helix angle. Thus, the splines on the lead bar 105 may be of different angle and the same hand as those on the lead bar 107 or they may be of opposite hand and either the same or different angle. Each of the lead bars are identically constructed, except for the helix angle of the splines, and each is similarly mounted in the fixture and carries the same operating parts thereon. Therefore, only the mechanism associated with the lead bar 105, which is shown in detail in Fig. 3, will be described, it being understood that similar part numbers apply to the operating parts for both lead bars.

A shouldered nut 125 having helical splines on the inner periphery thereof adapted to engage the helical splines on the lead bar, surrounds the lead bar and the shouldered upper end thereof rests on a recessed upper surface 127 of the main cover member 43. The upper surface of the housing member 17 adjacent the lead bar aperture is recessed, as at 133, and a gear 135 is positioned therein and keyed to the nut 125 at 137. The gear is rotatably supported in the housing by means of an antifriction bearing 139, the outer race of which is received in a recess 141 in the housing. A conventional oil seal 143 is received in a recess 145 in the bottom face of the housing to prevent leakage of oil. The gear 135 is rotatably supported in the lower cover member 43 by means of an antifriction bearing 147, the outer race of which is pressed into a recess 149 in the lower face of the cover member 43. A thrust washer 151 is positioned within the recess and on top of the bearing 147. The upper surface of the lower cover member 43, adjacent the lead bar aperture, is recessed as at 153 and an oil seal 154 is received therein and abuts the upper surface of the washer 151. The lower end of the nut 125 is threaded as at 155 to receive lock nuts 157 which lock the nut 125 in position with respect to the gear 135. It will be noted that the gears 135 on each of the lead bars 105 and 107 are adjacent to the gear 89 mounted in the member 49 and are in the same plane with the result that by swinging member 49, the gear 89 can be meshed with the gear 135 on either of the lead bars, as desired.

In order to lubricate the gears 135 on each of the lead bars 105 and 107, conventional grease fittings 161 are provided which project outwardly from the lower cover member and communicate with each of the gears 135.

The lower end of the chuck 15 is provided with a recess 163 therein, in which is received a broach puller 165 which is interchangeable to receive various sized broaches. The broach puller 165 is locked in position in the chuck by a key 167 which is fixed by screws 173 in a recess 169 in the chuck body and which has a tongue 171 that projects into an annular recess in the shank of the broach.

In the operation, if it is desired to broach straight splines or other forms of openings in the workpiece, the sliding member 49 is positioned so that the lock pin 59 will be received in the central aperture 75 in the lower cover member. When in this position, as illustrated in Fig. 1, the gear 89 will be in mesh only with the gear 36, which is connected to the chuck and will be out of engagement with the gears 135 on both of the lead bars. Therefore, no rotation of the chuck will occur upon movement of the sliding ram 11 of the broaching machine.

If it is desired to broach splines of the type produced by lead bar 105, the lock pin 59 is pulled upwardly so as to be out of engagement with the lower cover member 43 and the member 49 is moved to the right so that the lower end of the lock pin 59 will be received in the aperture 77 in the lower cover member and the gear 89 will mesh with the gear 135 on the lead bar 105, as well as the gear 36 on the chuck.

If it is desired to broach splines of the type produced by lead bar 107, it is merely necessary to pull the lock pin upwardly and swing the member 49 to the left so that the lower end of the lock pin will be received in the aperture 73 in the lower cover member. The gear 89 will then be in mesh with the gear 135 on the lead bar 107 as well as the gear 36 on the chuck.

Due to the cover arrangement of the fixture, it can be easily repaired, or any worn out parts can be replaced. By removing the upper cover 91, the sliding member 49 will be exposed, and can be lifted from the fixture. The lower cover plate can then easily be removed and any worn out parts can be replaced easily and quickly.

It can therefore be seen that this fixture is adapted to be mounted on any type of conventional pull broach machine and will allow by simple adjustment, broaching of either one of two types of helical splines, or straight openings, in the workpiece. It will be understood that the machine is equally adapted to broach internal gears or any irregularly shaped opening having a helix angle.

What is claimed is:

1. A broach moving fixture for broaching helices and the like including a frame, holding means carried by the frame for fixedly supporting in parallel relation a plurality of lead bars having different helical splines, a broach moving head slidable lengthwise with respect to said lead bars and adjacent such lead bars, a broach moving chuck journaled in said head on an axis parallel to said lead bars, a pair of traveling nuts carried by said head, one of said nuts being threadedly intermeshed with each of said lead bars, a gear drivably connected to each nut, a gear drivably connected to said chuck, and means for selectively establishing a driving connection between said last gear and either of said first gears in order to broach different forms of helical openings, comprising a shift member also carried by the head and movable to selectively and alternatively make and break driving connections between said gear connected to the chuck and either of said first gears.

2. A broach pulling fixture for helical broaching, including a pair of stationary parallel helical lead bars having helical splines of different helix angles, a broach pulling head comprising a housing slidable lengthwise with respect to said lead bars and having openings through which the lead bars project, a broach pulling chuck having a shank journaled in said housing on an axis parallel to said lead bars, a pair of splined nuts on said lead bars respectively and located within said housing, a gear on each nut, a gear on said chuck shank, a member pivotally mounted within said housing on an axis concentric with said chuck shank, a gear journaled on said member and in constant mesh with the gear on said chuck shank, and means for swinging said member into and locking the same in any one of two positions, in one of which the gear on said member meshes with the gear on one of said nuts, and in the other it meshes with the gear on the other nut.

3. A broach pulling fixture for helical broaching including a pair of stationary parallel helical lead bars having helical splines of different helix angles, a broach pulling head comprising a housing slidable lengthwise with respect to said lead bars and having openings through which the lead bars project, a broach pulling chuck having a shank journaled in said housing on an axis parallel to said lead bars, a pair of splined nuts on said lead bars respectively and located within said housing, a gear on each nut, a gear on said chuck shank, a member pivotally mounted within said housing on an axis concentric with said chuck shank, a gear journaled on said member and in constant mesh with the gear on said chuck shank, and means for swinging said member into and locking the same in any one of three positions in one of which the gear on said member meshes with the gear on one of said nuts, in the second of which the gear on said member meshes with the gear on the other nut and in the third, it is out of mesh with both of the gears mounted on said nuts.

4. A fixture as defined in claim 1 wherein said shift member comprises a frame carrying an idler gear constantly meshing with the gear connected to the chuck, said frame being swingable about the axis of said gear connected to the chuck to move the idler into and out of mesh with either of said gears connected to the nuts.

5. A fixture as defined in claim 1 wherein each of the first two mentioned gears is concentric with one of the nuts and the last gear is concentric with the chuck, said shift member comprising a frame carrying an idler gear constantly meshing with the gear connected to the chuck, said frame being swingable about the axis of said chuck to move the idler into and out of mesh with either of said gears connected to the nuts.

HARRY H. GOTBERG.

REFERENCES CITED

The following references are of record in the file of this patent:

UNITED STATES PATENTS

| Number | Name | Date |
|---|---|---|
| 1,023,593 | Pool | Apr. 16, 1912 |
| 2,043,596 | Rovick | June 9, 1936 |
| 2,158,720 | Hart | May 16, 1939 |